Jan. 12, 1926.
M. J. BROWN
1,569,171
APPARATUS FOR PRODUCING AND RESOVERING REACTION GASES
Filed March 26 1925
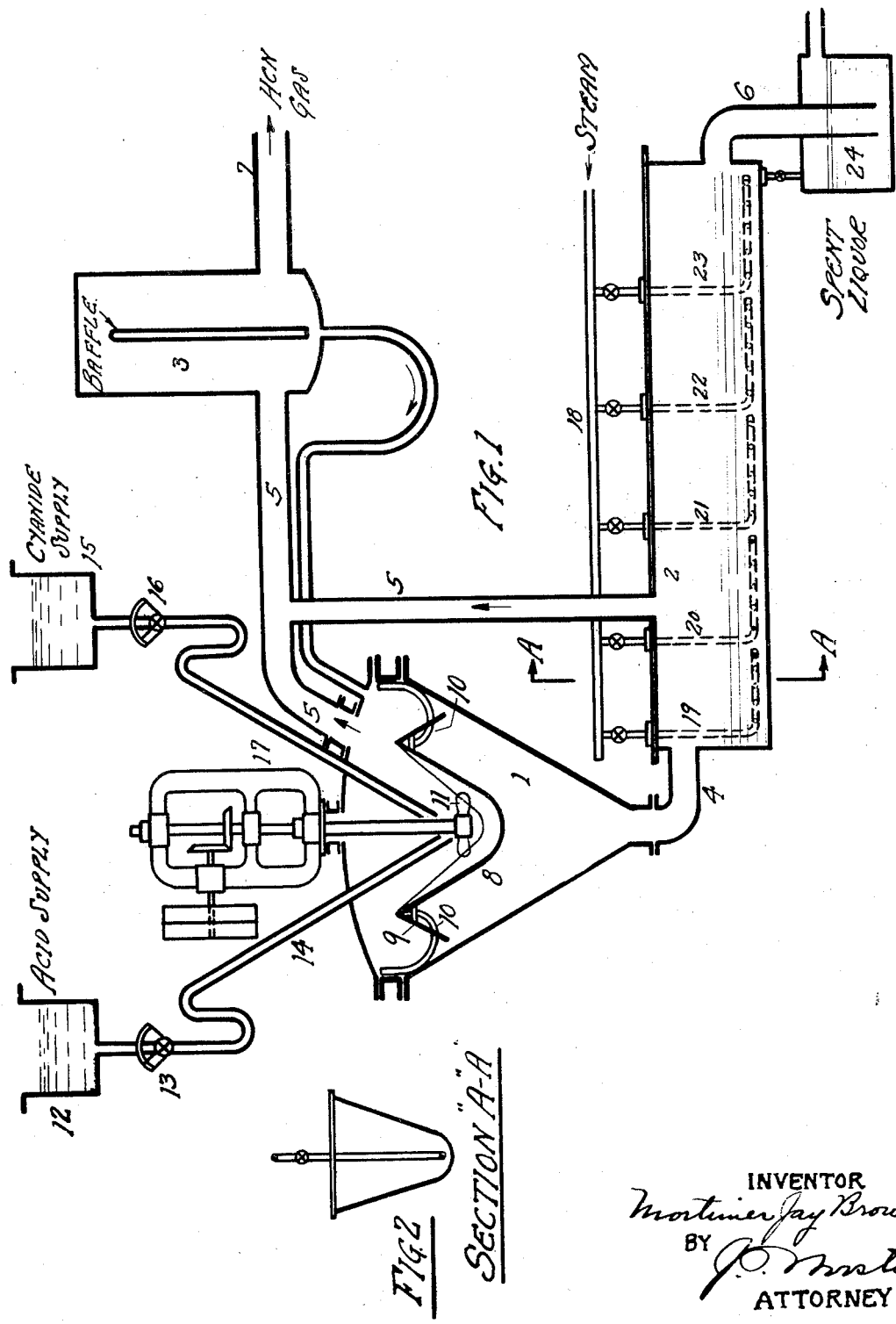
INVENTOR
Mortimer Jay Brown
BY
ATTORNEY Patented Jan. 12, 1926.

1,569,171

UNITED STATES PATENT OFFICE.

MORTIMER JAY BROWN, OF NIAGARA FALLS, NEW YORK, ASSIGNOR TO THE PACIFIC R. & H. CHEMICAL CORPORATION, OF EL MONTE, CALIFORNIA, A CORPORATION OF CALIFORNIA.

APPARATUS FOR PRODUCING AND RECOVERING REACTION GASES.

Application filed March 26, 1925. Serial No. 18,458.

*To all whom it may concern:*

Be it known that I, MORTIMER JAY BROWN, a citizen of the United States, and resident of Niagara Falls, in the county of Niagara and State of New York, have invented certain new and useful Improvements in Apparatus for Producing and Recovering Reaction Gases, of which the following is a specification.

This invention relates to apparatus for effecting chemical reactions between liquids, solids and gases wherein both continuity and control of reaction velocity and temperature are desired, and wherein the desired reaction gas can be recovered as formed without danger of hydrolysis, deterioration, or decomposition in the spent liquor discharged.

Many reactions, such as that between sulphuric acid and cyanide solution to produce hydrocyanic acid gas, require close control of both temperature and reaction velocity in order to prevent loss of yield. A continuous apparatus is desirable in order to avoid the disadvantages of batch processes and also the necessity of maintaining each mass of reaction liquid at a more or less constant temperature. While the reaction between a cyanide and sulphuric acid to produce hydrocyanic acid is relatively simple, it is difficult to get good yields because overheating tends to hydrolyze hydrocyanic acid to form ammonia compounds, and the rate of hydrolysis increases with temperature and acid concentration. Again, a gas, such as hydrocyanic acid, may be to some extent soluble in the liquid and require heat to drive it off without at the same time hydrolyzing it.

In working out the process forming the subject matter of my application Serial No. 685,505, filed January 11, 1924, of which this application is a continuation in part, I evolved the apparatus disclosed, which is suitable not only for production of hydrocyanic acid according to said process, but for many other gases or vaporous products which are subject to hydrolysis, polymerization, or decomposition in the solution where formed, unless promptly removed.

The apparatus embodying this invention consists in its broadest aspect of a heated or unheated mixing vessel with mechanical agitation into which the liquid, or solid, or gas to be reacted, is continuously and simultaneously flowed at controlled rates, with the vessel and agitating means so constructed that the reacting materials are conveyed away by overflow as mixed, and discharged. To collect the gas released from such a mixture and to discharge the effluent, the mixing reaction vessel is enclosed within a larger vessel having a gas discharge at the top and a liquid discharge at the bottom. In case the liquid effluent carries further recoverable gas, a third vessel is provided to receive the liquid effluent, and heat it so as to expel the residue of gas. The spent liquid then discharges through a trap.

In the accompanying drawing:

Figure 1 is a diagrammatic elevation of an apparatus embodied in the invention, and Fig. 2 is a cross sectional elevation on the line A—A of Fig 1, showing the discharge vessel.

1 is a funnel shaped vessel, preferably lined with lead. 2 is a side view of the heating equipment. This has a V shaped cross section as shown in Figure 2 and its length depends upon the capacity required. 3 is a separator for removing entrained liquids from the evolved gas. The generating vessel 1 is connected to the heater 2 by the pipe 4. Gas, water vapor and entrained liquids pass off from the mixer and the heater by pipes 5 to the lead separator 3, whence the gas passes through pipe 7 to whatever receiving equipment is needed, which may be either an absorber or rectifying column. In the mixer, 1 is a conical shaped vessel 8 centrally located, open at the top, supported by arms 10 and provided with an annular curtain 9, supported from the upper edge of the vessel 8. Centrally located in the vessel 8 but sufficiently high to function properly is a propeller 11, driven by a shaft projecting through a stuffing box above. 12 is an overhead supply tank for strong sulphuric acid or other reagent. This acid passes through a valve 13 and pipe 14 into the bowl 8 of the mixer. Valve 13 is supplied with a suitable dial so that a constant flow may be maintained. Another reagent such as gas, cyanide solution, or slurry is held in tank 15. The solution or slurry passes through regulating valve 16 similar to regulating valve 13 and through pipe 17 into the bowl 8 of the mixer. The reagents from tanks 12 and 15 may be heated before being discharged into bowl A, or the bowl A may be heated as by an electric heater coil, or the heat of reaction from the reagents may be utilized. In manufacturing hydrocyanic acid the heat of reaction of sulphuric acid and cyanide solution is sufficient, whereas during mixing the solution is flowing away from the supply and the gas goes off so quickly that it cannot be hydrolyzed, while the solution is spread out so thin in overflowing from the bowl 8 as to facilitate release of gas, whether or not vacuum be applied on pipe 7, as may be done if desired.

18 is a manifold providing live steam into steam lines 19, 20, 21, 22, 23 and as many more steam lines as may be needed in the heater 2. 24 is a trap for spent liquid or slurry and the pipe 6 leads from the end of the heater to beneath the liquid or slurry level in the trap.

To operate this apparatus for producing hydrocyanic acid the propeller 11 is started at a previously determined speed which speed will depend upon the size and rated capacity of the equipment. This speed should be approximately determined by trial for every piece of equipment. A stream of sulphuric acid is then introduced into the bowl 8 and immediately thereafter a stream of cyanide solution or slurry. It is necessary to previously calibrate the dials on valves 13 and 16 so that for whatever rate of output is desired the two streams will properly correspond. When the two streams are running full there should always be a slight excess of acid. This is necessary because if the system becomes alkaline ammonia is liberated from the solution due to hydrolysis of the hydrocyanic acid. For many purposes this is highly undesirable. I have found that there is no difficulty in maintaining a proper relationship between the two supplies. The simultaneous introduction of the reagents combined with the action of the propeller 11 results in an almost instantaneous mixing and instantaneous elevation of temperature due to heats of reaction and of dilution. The liquid remains in the bowl 8 for a few seconds only, it being thrown outward and upward over the edge of the bowl after which it goes down by gravity along the curtain 9 to the inner wall of the cone of the vessel 1. The hot mixed liquid passes down the inner wall of the vessel 1 and through pipe 4 into heater 2. The operation of mixing the reagents and of throwing the mixture over the edge of the bowl 8 is continuous and there is a steady evolution of hydrocyanic acid gas from the thinly spread out liquid, which gas passes out through pipe 5 to trap 3. As has been indicated only a few seconds intervene between the entrance of the reagents through their respective pipes and the exit of the mixture through pipe 4. The liquid level in the heater 2 is determined by the position of the outlet pipe 6 at which point there is a constant gravity overflow which continues as long as there is an input of liquid through pipe 4. The steam pipes 19 to 23, discharge live steam at the bottom of the heater and they therefore produce a rapid heating and an agitation. The heating results in rapid elimination of the hydrocyanic acid gas and the agitation due to the use of live steam prevents the settling of any solid phases that may be carried by the liquid or slurry along toward the outlet. Steam pipe 19 brings the liquid almost immediately from the temperature at which it comes to the heater up to the boiling point. The other heating pipes in their turn continue the boiling operation so that before the liquid reaches the exit trap 24 all hydrocyanic acid has been expelled. It will thus be seen that the heating operation is entirely different from that prevailing in larger generators when solutions are being treated as batches, in that liquid from which hydrocyanic acid has been evolved has no way of returning to and mixing with any part of the liquid holding a higher percentage of hydrocyanic acid. All hydrocyanic acid from the heater passes through pipe 5 into the lead separator 3. Thus, there is maintained in the mixer and the heater the same gaseous pressure.

This process is easy to start. It can be operated continuously for indefinite periods and requires little supervision regardless of the capacity at which it is being run. Since the excess of acid is at all times very small and since the total time interval elapsing from the time of mixing to the time of discharging is never more than a few minutes the losses due to hydrolysis of hydrocyanic acid are held at a low figure.

Although the apparatus has been particularly described in connection with the manufacture of hydrocyanic acid, I do not restrict myself thereto, as this apparatus is suitable for manufacturing numerous other products, such, for example, as acetaldehyde by feeding diluted heated sulphuric acid and mercury catalyst into the bowl from one supply, and excess of acetylene from the other, and mixing same in the bowl before overflowing the solution, thus allowing for carrying away of acetaldehyde as formed without polymerization or resinification. The liquid discharged into tank 2 can be further heated to drive off the remainder of the acetaldehyde, while precipitated mercury can be recovered from the trap 24 and the liquor reused if desired.

Various modifications and changes may be made in the details described without departing from the scope of the invention.

I claim:

1. In apparatus for producing reaction gas from a solution, a vessel for receiving solution, means for continuously supplying reacting solution ingredients to the vessel, mixing means flowing the solution during mixing in the vessel away from the supply, means for continuously discharging the reacted solution from the vessel, and means for collecting the reaction gas liberated from the solution during such mixing and discharge.

2. The combination with a vessel having a discharge outlet for reacted liquid and a separate outlet for reaction gas, of a mixing bowl within the vessel arranged to overflow into the latter, and regulated means for supplying reacting liquid to the bowl to produce reaction gas.

3. The combination with a vessel having a discharge outlet for reacted liquid and a separate outlet for reaction gas, of a mixing bowl within the vessel arranged to overflow into the latter, regulated means for supplying reacting liquid to the bowl to produce reaction gas, and means for expelling and collecting further reaction gas from the discharged liquid.

4. The combination with a vessel having a discharge outlet for reacted liquid and a separate outlet for reaction gas, of a mixing bowl within the vessel arranged to overflow into the latter, regulated means for separately flowing acid and material to be treated into the bowl to produce reaction gas, and mixing means within the bowl for flowing the solution away from the supply of either ingredient toward the overflow.

5. In apparatus for producing reaction gas from a solution, a vessel for receiving solution, means for continuously supplying reacting solution ingredients to the vessel, mixing means flowing the solution during mixing in the vessel away from the supply, means for continuously discharging the reacted solution from the vessel, a second vessel receiving the discharge, heating means for driving off residual gas, gas collecting means, and means for receiving spent liquor.

6. In apparatus for continuously producing gas from a reacting solution, means for separately continuously supplying and mixing the solution ingredients out of contact with fresh supply of either ingredient, means for heating the mixture in such manner that liquid at any given stage of heating operation is out of contact with other portions that have had either more or less heating, and means for continuously collecting the gas and discharging the effluent.

7. In apparatus for continuously producing gas from a reacting solution, means for continuously delivering and mixing the ingredients out of contact with fresh supplies of either ingredient, accelerating means, means for heating the mixture in such manner that liquid at any given stage of the heating operation is out of contact with other portions that have had either more or less heating, means for continuously discharging the effluent, and means for collecting the reaction gas produced.

8. In apparatus for continuously producing gas from a reacting solution, means for continuously mixing the ingredients in such manner that the mixed liquids leave the point of mixing quickly, means for heating the ingredients so mixed in such manner that no portion of the liquid has an opportunity to mix with other portions that have been subjected to either more or less heating, and means for separately continuously discharging the gas and effluent so formed.

9. In apparatus for continuously producing hydrocyanic acid from acid and solution of cyanide, means for continuously mixing the ingredients in such manner that the mixed liquids leave the point of mixing quickly, means for heating the ingredients so mixed in such manner that no portion of the liquid has an opportunity to mix with other portions that have been subjected to either more or less heating, means for continuously discharging the effluent so formed, and means for collecting the hydrocyanic acid produced.

10. The combination with a chamber containing a vessel for receiving streams of reacting liquids, of means for delivering streams into the vessel, means for mixing the streams and continuously discharging the mixture out of the vessel, means for collecting evolved gas from the chamber, means for heating the effluent collected by the chamber, and means for collecting gas evolved from the heated effluent.

11. The combination with a chamber containing a bowl shaped vessel for receiving streams of reacting liquids, of means for delivering streams into the vessel, a propeller in the vessel for mixing the streams and continuously discharging the mixture out of the vessel, means for collecting evolved gas from the chamber, and means for discharging the effluent collected by the chamber.

12. The combination with a chamber containing a vessel for receiving streams of reacting liquids, of means for delivering streams into the vessel, means for mixing the streams and continuously discharging the mixture out of the vessel, means for collecting evolved gas from the chamber, means for discharging the effluent collected by the chamber, means for collecting gas evolved from the effluent and means for continuously discharging spent effluent.

Signed at Niagara Falls, in the county of Niagara and State of New York, this 20th day of March A. D. 1925.

MORTIMER JAY BROWN.